United States Patent [19]

Herrmann, Jr.

[11] 4,335,932
[45] Jun. 22, 1982

[54] ELASTOMERIC POTTING SHELL

[75] Inventor: Henry O. Herrmann, Jr., Mt. Joy, Pa.

[73] Assignee: AMP Incorporated, Harriburg, Pa.

[21] Appl. No.: 125,824

[22] Filed: Feb. 29, 1980

[51] Int. Cl.³ ..................... B29C 6/04; H01R 13/504
[52] U.S. Cl. ........................... 339/218 M; 174/52 PE;
264/272.18; 339/92 M
[58] Field of Search ........................... 339/218, 92 M;
174/52 PE; 264/262, 263, 267, 271-272, 20

[56] References Cited

U.S. PATENT DOCUMENTS

| | | | |
|---|---|---|---|
| 3,082,398 | 3/1963 | Valach | 339/92 M |
| 3,411,130 | 11/1968 | Bushey | 339/176 |
| 3,853,381 | 12/1974 | Morningstar | 339/92 M |
| 3,889,365 | 6/1975 | Brock | 264/272 X |
| 3,961,295 | 6/1976 | Hollyday et al. | 333/79 |

FOREIGN PATENT DOCUMENTS 1447412 6/1976 France .............................. 339/92 M Primary Examiner—Eugene F. Desmond
Attorney, Agent, or Firm—Russell J. Egan

[57] ABSTRACT

A potting shell of resilient material is disclosed. The shell has an inwardly directed resilient lip which makes a wiping engagement with a rigid connector housing which is to be potted. The wiping engagement provides efficient sealing so that the previously required adhesives can be omitted. The elastomeric shell assumes sufficient rigidity after potting to become an integral part of the connector.

6 Claims, 5 Drawing Figures

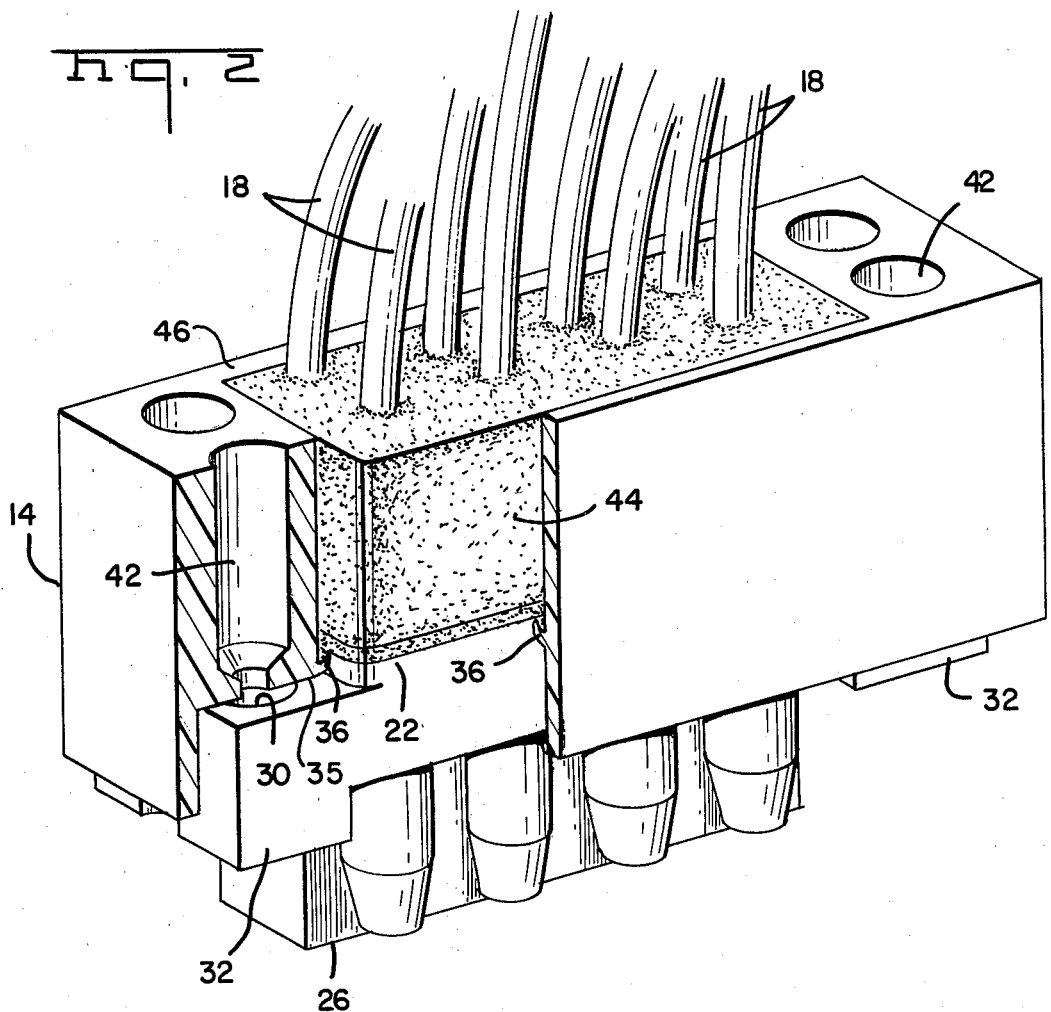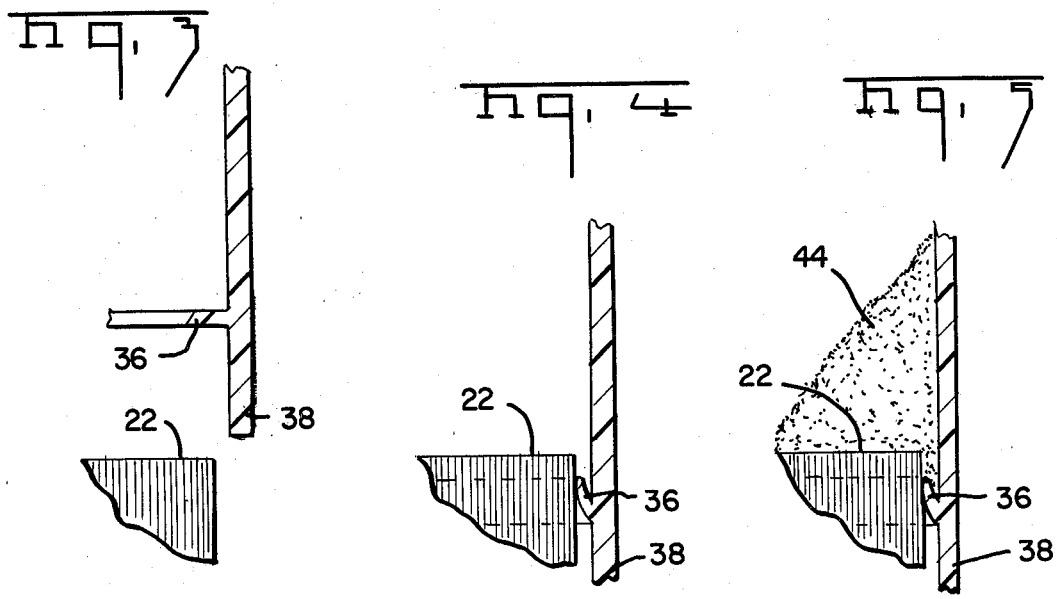

ELASTOMERIC POTTING SHELL

BACKGROUND OF THE INVENTION

1. The Field of the Invention

The present invention relates to a resilient potting shell and in particular to a shell which provides adequate sealing for the potting material thereby omitting the previously required gluing step.

2. The Prior Art

The previous methods for utilizing potting shells have all required that the shell be of a rigid configuration and that it be applied to a connector body by a bonding step. This is generally a time consuming and tedious process which does not always result in product having the best overall appearance. It is quite common for the bonding adhesives to run thereby marring the outer surface of the connector. It is also very tedious in that the adhesive must be applied to either the interior of the shell or the exterior of the body prior to joining the two members and the adhesive can readily be squeezed out to make an unsightly marr on the connector. It is also quite slow in that it is necessary to have adequate time for the adhesive to properly set before continuing the processing of the connector.

SUMMARY OF THE INVENTION

The present invention concerns a flexible potting shell which is preferably made of an elastomeric material and has a general configuration suitable to mate with a rigid body to be potted. The shell has an inwardly directed flange about its entire periphery adjacent one edge thereof. The flange is preferably sufficiently resilient so that a wiping engagement is formed between the flange and the rigid body to be potted. When potting material is applied to the shell, the flange forms a seal between the shell and the body preventing leakage of the potting material from the shell. The shell becomes rigid upon setting up of the potting material.

It should be noted that the subject elastomeric shell can also include mounting extensions containing apertures for jack screws and the like. These extensions will remain relatively resilient after the potting material hardens. Latching lugs can be provided to assure retention of the shell on an associate housing prior to the potting material making an integral unit of the housing and shell.

It is therefore an object of the present invention to produce an improved potting shell which will obviate the requirement for adhesives to tightly secure the shell to an associated housing.

It is another object of the present invention to produce an improved potting shell which can be readily assembled with a rigid connector housing and which needs no additional material in order to assure a sealing condition between the housing and the shell.

It is another object of the present invention to produce a potting shell which will, in its initial condition, be sufficiently resilient to provide adequate sealing between it and an associate connector housing without the use of adhesives or the like and yet in a final condition will be sufficiently rigid for unitary connector considerations and yet have resilient portions suitable for mounting of jack screws and the like.

It is yet another object of the present invention to produce a resilient elastomeric potting shell that can be snap connected to an associate connector housing and will form an effective seal therebetween without the use of adhesives, sealants, or the like.

It is still another object of the present invention to produce an elastomeric potting shell which will utilize a greater amount of potting material by eliminating the requirement for adhesive material.

It is a further object of the present invention to produce an elastomeric potting shell which can be readily and economically manufactured.

The means for accomplishing the foregoing objects and other advantages will become apparent to those skilled in the art from the following detailed description taken with reference to the accompanying drawings.

BRIEF DESCRIPTION OF THE DRAWINGS

FIG. 2 is a perspective view similar to FIG. 1 showing a fully assembled electrical connector including the potting shell of the present invention;

FIG. 3 is a fragmentary section showing the subject potting shell exploded from a connector as in FIG. 1;

FIG. 4 is a fragmentary section showing the subject potting shell in engagement with a connector housing and prior to the potting thereof; and FIG. 5 is a fragmentary section showing the subject potting shell in a potted condition as in FIG. 2.

DETAILED DESCRIPTION OF THE PREFERRED EMBODIMENT

Figure 1:
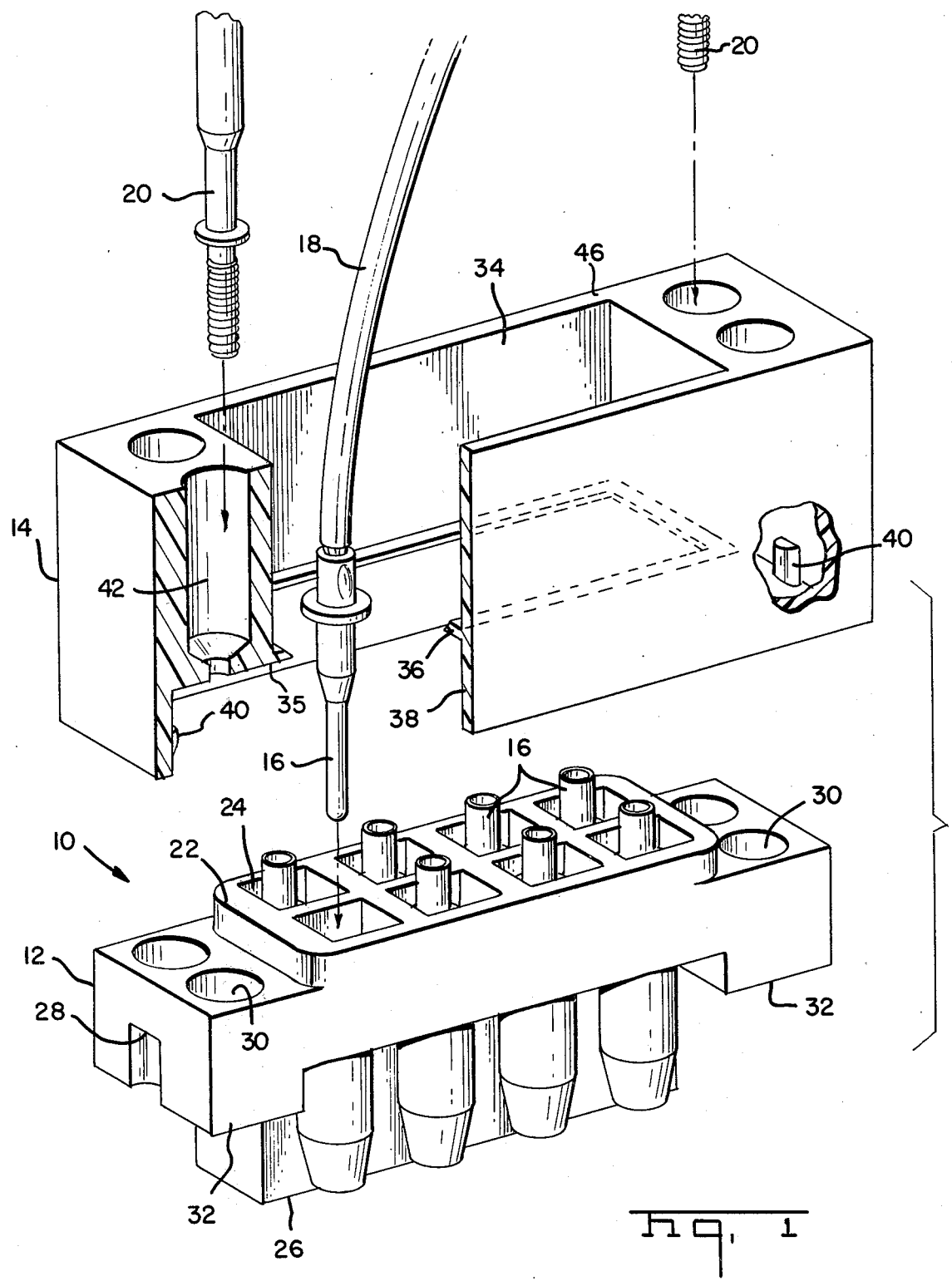
FIG. 1 is an exploded perspective view, partially in section, of the subject elastomeric potting shell together with components of a representative connector.

The electrical connector 10 shown in FIGS. 1 and 2 includes a connector housing 12, the subject potting shell 14, a plurality of terminals 16 each terminating an appropriate conductor 18, and jack screw means 20.

The connector housing 12 can be of any configuration and be provided with a rearwardly directed shoulder 22 defining an area to be potted. Within the potting area are a plurality of through bores 24 which receive the terminal 16 and which extend to a mating face 26. The housing also includes latching recesses 28 and jack screw bores 30 in end portions 32.

The subject potting shell 14 is preferably made of an elastomeric material and has a series of interconnected walls forming a profile that defines an open-ended central chamber 34. Adjacent the connector-receiving end 35 of the chamber 34 there is an inwardly directed, annular, resilient flange 36 which defines a profile similar to that of the shoulder 22 but with an opening smaller than the area defined by shoulder 22 so that a wiping or interference engagement is formed therebetween. The shell 14 also includes a lower flange or skirt 38 carrying thereon inwardly directed latching lugs 40 which are aligned to mate with latching recesses 28. The shell also includes jack screw bores 42 at the ends thereof, each aligned with a respective jack screw bore 30 in the housing.

The jack screw 20 is of known configuration, such as that shown in U.S. Pat. No. 3,853,381, and can be formed from either metal or plastics material. Further savings can be effected by making the jackscrew in a one piece construction. The configuration of the terminal 16 and the makeup of the conductor 18 are also of a standard type and therefore will not be described in detail in the present application.

The operation of the subject potting shell will be described primarily with reference to FIGS. 3 to 5. It will be noted from FIG. 3 that the flange 36 overlaps the rear of the shoulder 22 so that when the shell 14 is applied to the housing 12 there is an interference wiping fit, as shown in FIG. 4. This wiping fit can be of sufficient force to maintain the shell in the desired position throughout the potting operation. It is not essential to have the latching lugs 40 but they will provide a means to insure proper positioning of the shell on the housing. They will also prevent any unintended dislocation of the shell during the potting operation.

It will be seen that as the potting material 44 is poured into the chamber 34 from the rearward end 46 that the flange 36 will prevent leakage of the potting material from the shell. Further, because the flange 36 is flexible, it can expand to fill any irregular gaps that develop between the shell and connector housing as the potting material 44 is applied. As shown in FIG. 5, this expansion is facilitated by the potting material 44 pressing the flange 36 downwardly toward the connector. Thus, even if the shell is substantially dislocated, the flange 36 will still remain in sufficiently close proximity to the housing that very little, if any, of the potting material will be expected to leak out of the chamber.

When the potting material has fully set up, the elastomeric shell will assume a rigid configuration over substantially its entire length giving the rear end of the connector great impact strength. The potting shell can also be used to retain jack screws by providing a one piece rigid central portion and resilient end portions for retaining the jack screw. It will also be seen that by the elimination of the previously required adhesive sealing means that the subject shell will yield an electrically stronger unit by having a greater volume of potting material in an equal sized shell.

The present invention may be subject to many modifications and changes without departing from the spirit or essential characteristics thereof. The present embodiment is therefore intended to be illustrative and not restrictive of the scope of the invention.

What is claimed is:

1. A potting shell of elastomeric material, said potting shell comprising:
    a series of interconnected walls forming a closed profile that defines an open-ended central chamber, said central chamber having a connector-receiving end and a rearward end, said connector-receiving end being profiled to receive a portion of a rigid connector housing; and
    a resilient inwardly directed annular flange adjacent said connector-receiving end, said annular flange defining a profile of smaller area than that of said portion of said housing whereby,
when said connector-receiving end receives said portion of said housing therein, said annular flange is deflected in a direction away from said connector-receiving end, said annular flange thereby wipingly engaging said portion of said housing as an expandable seal so that potting material introduced into said central chamber from said rearward end is prevented from flowing out of said central chamber at said connector-receiving end.

2. A shell according to claim 1 further comprising: latching means engageable with said housing.

3. A potting shell according to claim 1 further comprising:
    at least one elongated end portion extending from said shell and having a bore passing therethrough, said bore receiving jack screw means, said end portion retaining its resilient characteristics after said shell is filled with hardened potting material.

4. In combination with an electrical connector having a rigid housing with a plurality of terminals mounted therein and terminating conductors extending therefrom, a potting shell of elastomeric material, said potting shell comprising:
    a series of interconnected walls forming a closed profile that defines an open-ended central chamber, said central chamber having a connector-receiving end and a rearward end, said connector-receiving end being profiled to receive a portion of said connector housing enclosing the conductors and terminals; and
    a resilient inwardly directed annular flange adjacent said connector-receiving end, said annular flange defining a profile of smaller area than that of said portion of said housing whereby,
when said connector-receiving end receives said portion of said housing therein, said annular flange is deflected in a direction away from said connector-receiving end, said annular flange thereby wipingly engaging said portion of said housing as an expandable seal so that potting material introduced into said central chamber from said rearward end is prevented from flowing out of said central chamber at said connector-receiving end.

5. A shell according to claim 4 further comprising: latching means engageable with said housing.

6. A potting shell according to claim 4 further comprising:
    at least one elongated end portion extending from said shell and having a bore passing therethrough, said bore receiving jack screw means, said end portion retaining its resilient characteristics after said shell is filled with hardened potting material.

* * * * *